June 25, 1946.  L. K. STRINGHAM  2,402,937
APPARATUS FOR ARC WELDING
Filed July 13, 1943  3 Sheets-Sheet 1

INVENTOR.
LEONIDAS K. STRINGHAM
BY
Oberlin, Limbach & Day.
ATTORNEYS

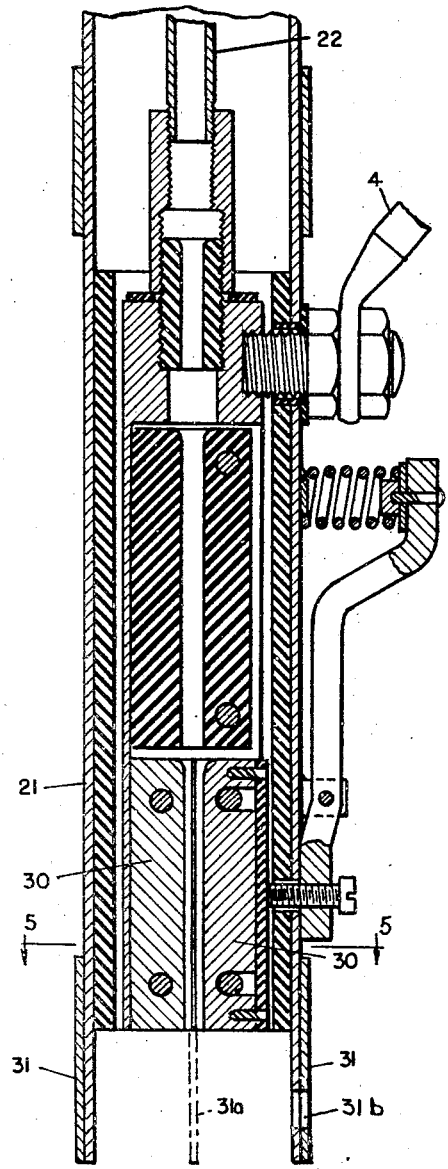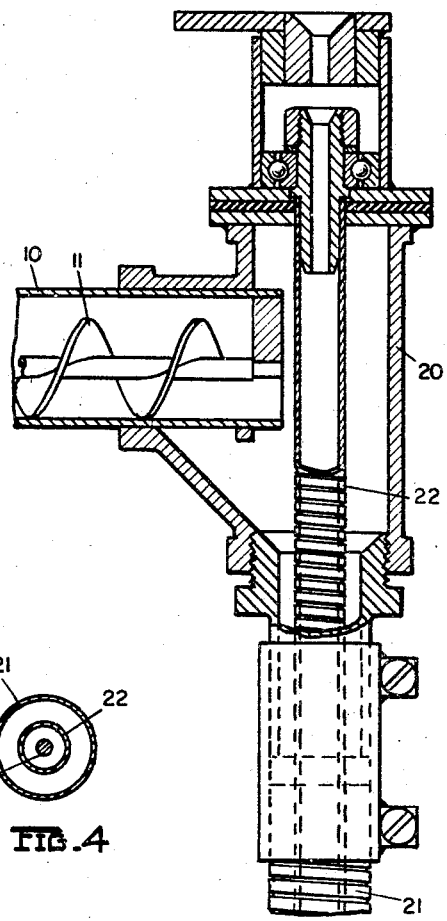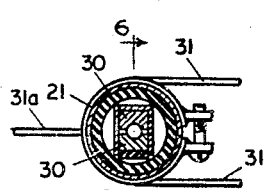

Patented June 25, 1946

2,402,937

UNITED STATES PATENT OFFICE 2,402,937

APPARATUS FOR ARC WELDING

Leonidas K. Stringham, University Heights, Ohio, assignor to The Lincoln Electric Company, Cleveland, Ohio, a corporation of Ohio Application July 13, 1943, Serial No. 494,454

8 Claims. (Cl. 219—8)

The present improvements, relating as indicated to arc welding, have more particular regard to arc welding in which a metallic weld rod is used in conjunction with a layer of flux deposited along the line to be welded. Still more particularly, although not limited thereto, said improvements have regard to that system or method of arc welding in which a weld rod or wire is designed to be fed continuously to the work.

Apparatus designed for operation in the last mentioned manner necessarily requires close correlation between the rate at which the arc is traversed relatively to the work and the rate at which the weld rod is fed to the work; and, so far as I am aware, such mode of operation has heretofore only been found practicable in so-called automatic types of welders, in which there is lacking the flexibility provided by so-called hand welding, as where a weld rod carried in a suitable holder is manipulated by the operator. A serious objection to such hand welding is of course the limitation imposed on the length of the weld rod which can be utilized and the necessity for replenishing such weld rod at intervals, together with the loss of material represented by the unused remnants of the weld rods.

Further difficulty is encountered where a deep layer of flux is laid on the work along the seam or line to be welded, since in such case the arc is concealed from view, or "submerged." In automatic welding through such a deep flux layer, it has heretofore been the practice to deposit the flux as a continuously maintained mass which rests on the surface of the work, and is then scraped off and shaped, as the operation proceeds, to form a so-called windrow of predetermined contour and dimensions. Such procedure is obviously impractical, when the welding device is freely manipulated by the operator, instead of being automatically moved relatively to the work at a predetermined rate of speed.

I have discovered that, particularly where the welding operation is thus carried on through a deep layer of flux, the rate of deposit of such flux may be made the basis for regulating the rate of welding, i. e. the rate at which the weld rod end is caused to traverse the line to be welded. I have further discovered that where in addition to thus regulating the traversing movement of the weld rod end provision is made for automatically feeding the weld rod toward the work so as to maintain the arc length constant, practically all of the advantages of automatic machine welding are obtainable in hand welding, with the added advantage of flexibility of operation inherent in the latter.

One principal object of the present invention accordingly is to provide a method and apparatus for manual arc welding in which the rate of the traversing movement of the weld rod end may be readily and accurately correlated with the rate at which a layer of flux is deposited along the line to be welded.

A further object is to provide a welding apparatus in which a weld rod or weld wire of indefinite length may be continuously fed, e. g. from a reel, to the point where the arc is established and the welding being done, while still permitting the end of the weld rod, or in other words the arc, to be manipulated with substantially the same degree of freedom enjoyed in so-called hand welding.

A still further object is to enable arc welding to be carried out manually through a deep layer of flux disposed along the line to be welded.

Other, more specific, objects of the invention are to provide improved means for feeding flux to the work simultaneously with the feeding of the weld rod or wire; to provide for such feeding of the flux in substantially unconfined or free falling condition, so that time becomes a factor in determining the thickness, or depth, of the deposited layer; and to provide for the automatic stopping of such flux feed, whenever the welding operation is stopped.

It is noted that claims to the method aspect of my invention have been required to be divided out of the present application and have been presented in my copending application filed March 17, 1944, Serial No. 526,935.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:

Fig. 3 is a vertical section of another portion of the apparatus located to the right of that shown in Fig. 2 and the plane of the section being at right angles to the plane of Fig. 2;

Fig. 4 is a horizontal section of still another part of the apparatus, the plane of the section being indicated by the line 4—4, Fig. 1;

Fig. 5 is a horizontal section of the same part taken on a lower plane, as indicated by the line 5—5, Fig. 1;

Fig. 6 is a vertical section as indicated by the line 6—6, Fig. 5; and

Figure 1:
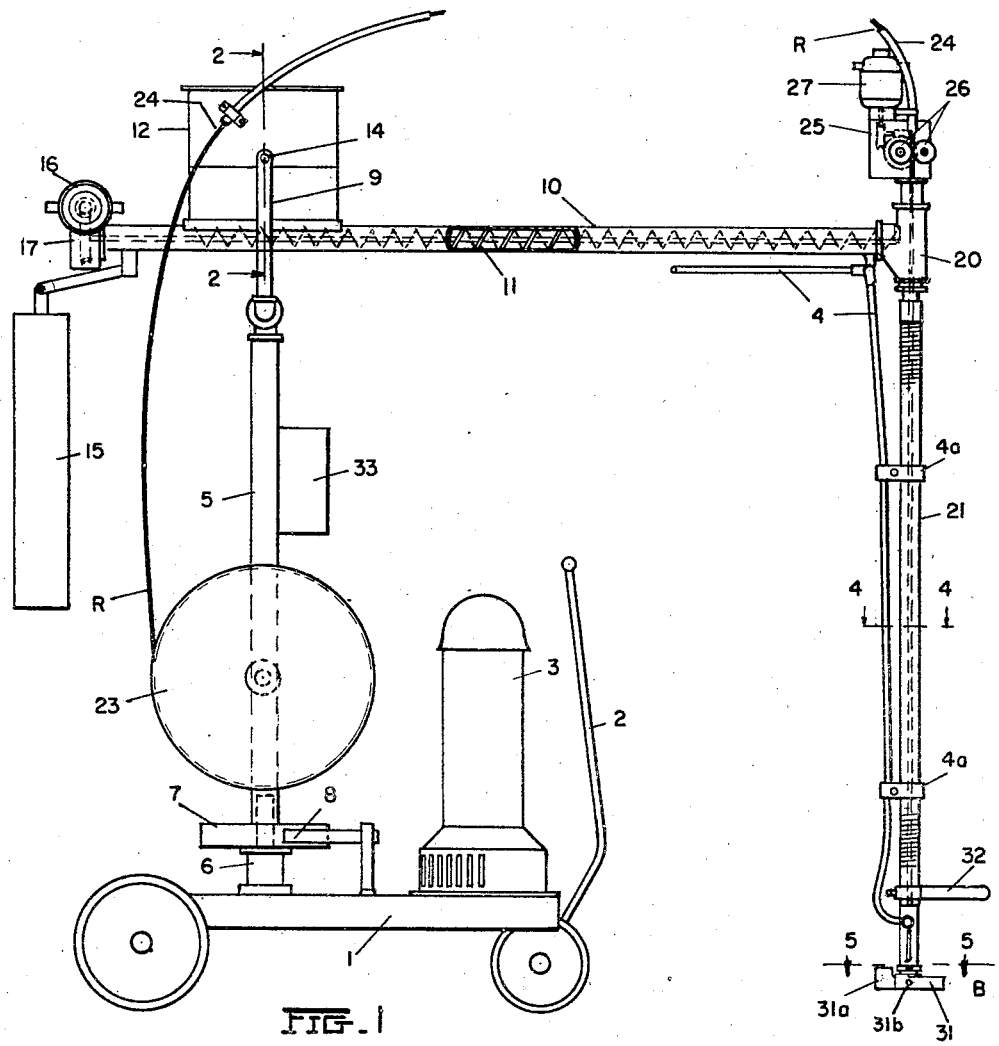
Fig. 1 is a side elevation more or less diagrammatic in character of one form of apparatus embodying my present improvements and adapted to carry out my improved process of arc welding.

Referring to Fig. 1, the illustrative form of apparatus there shown is intended to constitute a self-contained portable welding unit which may be readily moved as a whole from one part of a shop or plant to another. In addition, such apparatus includes means for movably and flexibly supporting what may be termed a welding tool so that the latter may be employed in a welding operation anywhere within a considerable area without moving the apparatus as a whole. As previously indicated, the apparatus includes means not only for feeding an indefinite length of weld rod or wire to the point where the welding operation is being carried out, but also for simultaneously supplying a granular fluxing material which may be deposited as a deep layer along the line being welded. Associated with the foregoing are various control means some of which are manual and others automatic. In particular, the feeding of the weld rod toward the work is automatically effected in accordance with the voltage across the arc so as to maintain the arc length constant even though the operator does not maintain a constant distance between the work and the welding tool or electrode holder.

In such illustrative form of apparatus the several component mechanisms are mounted on a truck body or wheeled support 1, provided with a handle 2 or equivalent means whereby the support may be moved about from place to place on the shop floor. However, it will be understood that said support will be stationary when a welding operation is in progress, i. e. the support will at least not ordinarily be moved during such operation.

Figure 7:
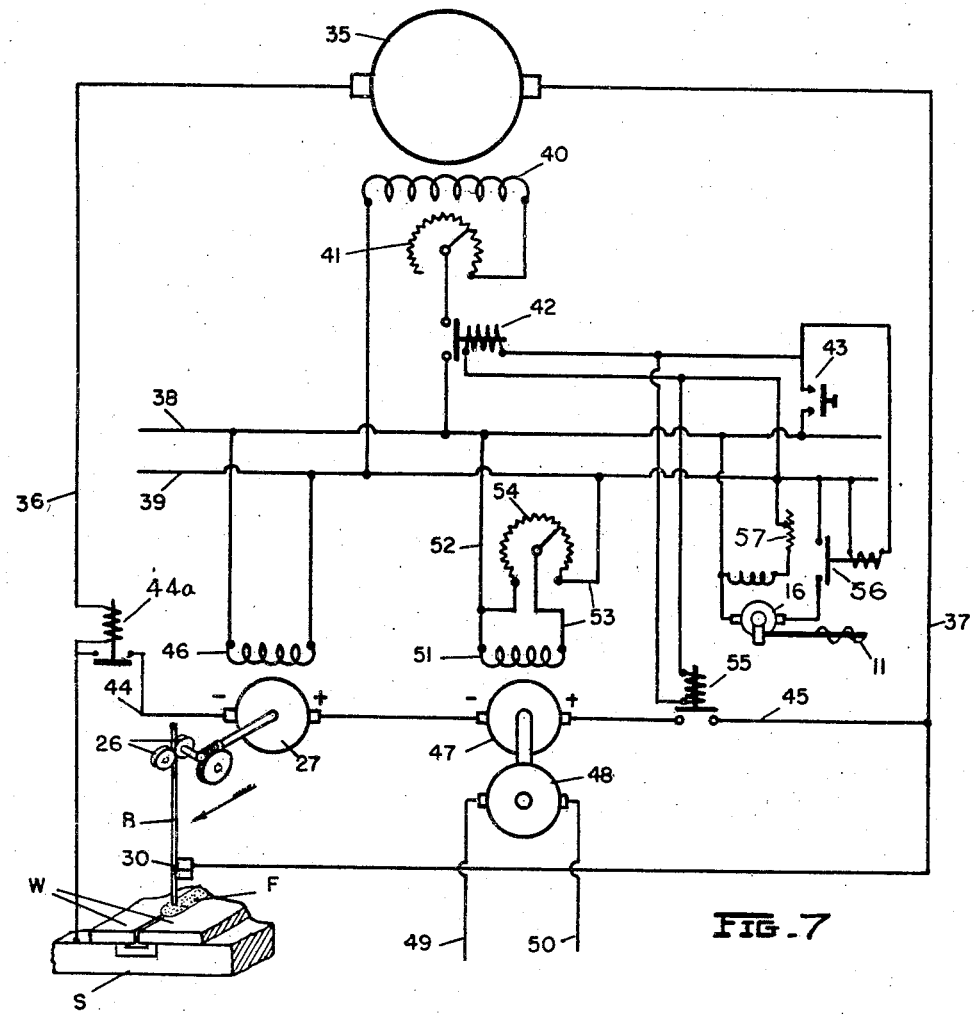
Fig. 7 represents diagrammatically an arrangement of arc welding and control circuits, where D. C. current is employed.

Mounted on the support adjacent its one end is a control generator 3, the interconnection of which with the welding and other circuits involved is shown in Fig. 7, presently to be described. Accordingly, save for the main conductor 4 whereby the welding current is conducted to the portable welding tool or electrode holder, all wiring is omitted from Fig. 1.

Mounted on support 1 adjacent its other end is a vertical post or column 5 which is rotatable about a vertical axis provided by a suitable bearing mounting 6 and which is provided with means such as a disk or polygonal plate 7 secured to its lower end and having edge contact with a flat spring 8 on support 1, whereby said post may be held in any one of a plurality of rotative positions about its axis.

The upper end of the post terminates in a U-shaped bracket 9 between the arms of which is mounted for oscillatory movement in a vertical plane a horizontally extending arm 10. The latter is preferably in the form of a tube within which is disposed a screw 11 by rotation of which granular fluxing material supplied to the tubular arm may be conveyed from the end thereof adjacent the post to its outer end.

Figure 2:
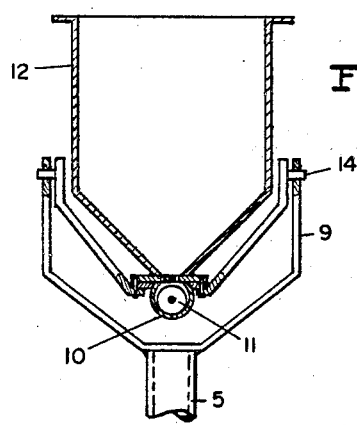
Fig. 2 is a section of one portion of such apparatus, the plane of such section being indicated by the line 2—2, Fig. 1.

Such material is thus supplied to tubular arm 10 from a hopper 12, the lower V-shaped portion of which (see Fig. 2) is firmly connected to tubular arm 10 and has a slotted opening 13 which communicates with the interior of the latter. This hopper further serves as the means of pivotal connection between the arm and bracket 9, the hopper being connected with the latter through aligned pivotal bearings 14 in the upper ends of the arms of said bracket. Connected with the short end of the arm which projects beyond hopper 14 is a counterweight 15 preferably in the form of a receptacle in which sand or the like may be placed so as to closely balance the oppositely extending longer portion of the arm together with the mechanism carried by the latter. An electric motor 16 which serves to drive the screw 11 through suitable worm gearing 17 is also mounted on such shorter end of the tubular arm 10 and serves as part of such counterweight.

Secured to the outer end of the longer portion of tubular arm 10 as by a T coupling 20 is a flexible tube 21 of approximately the same diameter as that of said tubular arm and of such length that its lower end will approximately reach the floor or other level on which the truck 1 rests. It will be understood, however, that where the welding operation is to be carried on at a higher level, as on a bench or table, than the floor on which the truck rests, said flexible tube 21 may be correspondingly shortened.

Concentrically supported within such depending flexible tube 21 is a second flexible tube 22 (see Figs. 3 and 4) through which the weld rod or wire R is guided downwardly to the work, such weld rod being taken from a reel 23 mounted on the post or column 5, thence carried upwardly through one or more guides 24 to a feeding mechanism 25 mounted on the upper face of the T coupling 20 which serves to connect the outer end of tubular arm 10 with the depending flexible tube 21, as described above. Such feed mechanism 25 includes a pair of feed rolls 26 and an electric motor 27 which is adapted to drive the same through suitable gearing, not shown, since the details of the feed mechanism form no part of the present invention.

Suitably mounted in the lower end of depending flexible tube 21 are two opposed electrodes or contact members 30 between which the weld rod or wire R passes as it emerges from the inner flexible guide tube 22. The conductor 4 which supplies the welding current is directly connected with these respective electrodes or contacts (see Figs. 5 and 6), the one such electrode being transversely movable towards the other under spring pressure, as shown in Fig. 6, so as to insure proper contact with the weld rod passing therebetween. These electrodes are of course electrically insulated from both the outer flexible tube 21 and the inner guide tube 22 and the latter will itself be desirably made of non-conducting material.

As shown in Fig. 4, there is a substantial annular space between the two tubes, and the electrodes or contacts 30 fill only a portion of such space so that a substantial segmental area is left clear on each side thereof through which granular fluxing material, discharged by screw 11 into the upper end of the flexible tube 21, may in turn be freely discharged onto the work adjacent the lower end of the weld rod or wire R as it emerges. If desired, one or the other of the openings, through which the flux is thus deposited along the seam to be welded, may be closed and such flux correspondingly deflected in relation to the weld rod. Spaced, parallel plates 31 attached to the lower end of tube 21 serve as additional means for directing the placement of the flux by preventing undue lateral spreading of the stream as it falls from the tube. Extending in the opposite direction from such lower tube end is another plate 31a which constitutes a seam sight, i. e. assists the operator in guiding the end of the weld rod, and thus the arc, along the seam, despite the fact such weld rod enters the flux layer and such arc is hidden, or "submerged." One, or both, of plates 31 may be provided with an opening 31b, forming a peep-hole, through which the operator may more readily observe not only the height of the flux layer as it is deposited, but also the degree of submergence of the weld rod end in such layer.

Clips 4a serve to attach the depending portion of the conductor 4 to the depending flexible tube 21 so that the former will be held closely to the latter despite any swinging or bending movement that may be imparted. To facilitate manipulation of the lower end of the flexible tube 21, which with the corresponding lower portion of the inner guide tube 22 and the contact members 30, constitutes the welding tool, one or more handles 32 may be provided, being adjustably clamped on such tube 21 adjacent its lower end. A box or panel 33 attached to post 5 above reel 23 carries the necessary switches for controlling motors 16 and 27, as well as certain parts of the control mechanism, now to be described, whereby operation of said motor 27 is automatically regulated to maintain the proper arc length between the lower end of weld rod or wire R and the work.

Referring to Fig. 7 where the motor 27 which thus feeds the weld rod or wire as well as other parts of the apparatus are wholly diagrammatically shown, the welding generator 35, it will be seen, has one lead 36 which is connected with the support S on which the work, shown as two plates which are to be welded together along juxtaposed edges, rests. The other lead 37 from generator 35, corresponding with the conductor 4 in the previously described figures, is of course connected with the contact members 30 which engage the lower end of electrode R as it is fed downwardly to the work.

A constant voltage supply line comprising leads 38 and 39 is provided, connected to a convenient external source of constant voltage, e. g. 115 v., and the field 40 of generator 35 is connected across said leads through a series rheostat 41 and a relay switch 42, the latter being controlled by means of a push button circuit generally indicated at 43. The armature of motor 27 which drives the weld rod feed rolls 26 is connected in parallel with the arc by means of leads 44 and 45, and the field winding 46 of said motor is connected across leads 38 and 39 of the external circuit or supply line. While, if desired, an adjustable rheostat may be included in the connections of such field winding, for most purposes none will be required.

A series relay switch 44a, included in lead 36, serves to control the supply of current through leads 44 and 45, and thus the actuation of weld rod feed motor 27.

Connected in series with the motor 27 and the lead 45 is a generator 47 which is one component of a conventional motor generator set, the motor 48 of which is connected across leads 49 and 50 constituting an external supply line. The field 51 of generator 47 is connected by means of leads 52 and 53 across supply lines 38 and 39, an adjustable rheostat 54 being included as shown. A relay switch 55 may also be included in the lead 45, as shown, being connected in parallel with the relay 42 in the push button circuit 12, as an alternative means to relay switch 44a for controlling the supply of current to weld rod feed motor 27.

Still another relay switch 56 is connected in parallel with the relay 42 in the circuit controlled by push button 43, said switch 56 serving to control the supply of current to the motor 16 whereby the feed screw 11 for the flux is operated. This motor is connected to leads 38 and 39, a rheostat 57 being included in the field of said motor whereby its speed may be controlled and the rate of feed of the flux thus set as desired.

The operation of my improved apparatus, both as to its mechanical components and the electrical circuits just described, will now be set forth. Assuming the work-pieces W to be set up and suitably secured to the support S and the apparatus on its support 1 to be located in convenient relation thereto, with the counterweighted arm 10 disposed so as to extend in the desired direction from such support 1, the operator, by means of the handle on the lower end of depending flexible tube 21, will move the welding tool, or in other words, the lower projecting end of the electrode R, into desired position to start the weld. Such movement is readily accomplished by reason of the free up and down swinging movement of which arm 10 is capable and the flexible character of the tube 21.

Thereupon push button 43 is pressed, starting motor 16, whereby feed screw 11 is operated and granular fluxing material is conveyed at a predetermined rate from hopper 12 to the upper end of the flexible tube 21. Such material will fall freely under gravity down the tube and start piling up on the work adjacent the projecting end of the weld rod. When a sufficient flux pile has been attained, the operator will then strike the arc in the usual manner.

The closing of push button circuit 43 will at the same time close relay switch 42, thus exciting generator 35 so that the arc will strike when the operator touches the work with the electrode. Also, if relay switch 55 be utilized, the circuit through leads 44 and 45 will at the same time be closed. However, it is preferred to utilize series switch 44a for the purpose, as this will result in the weld rod feed motor starting at the instant the arc is struck. In this manner, sufficient flux may accumulate before the arc is struck or before the weld rod starts to feed.

After the arc is struck the proper arc length will then be automatically maintained, assuming that the voltage generated by generator 47 has been properly adjusted by varying the strength of the field 51 by means of rheostat 54. In other words, the voltage thus generated will be constant regardless of the arc voltage, the value selected bearing a predetermined relation to the value at which it is desired to maintain the arc voltage. Accordingly, the voltage applied across the terminals of the armature of motor 27 which feeds the weld rod to the work is a resultant of the arc voltage and the voltage across said generator 47. These two voltages, being in opposition to each other, when the voltage across the arc reaches that generated by generator 47 (proper allowance being made of course for the usual voltage drops involved in equipment of this kind)

there will be no voltage applied across the terminals of the armature of motor 27.

Accordingly, when relay switches 42 and 44a (or 55) are closed with the electrode out of contact with the work, the voltage across the armature of motor 27 will be the difference between the open circuit voltage of the current generator 35 and that generated by generator 47, e. g. if such open circuit voltage is 90 v. and that of the generator is 30 v., then a resultant of 60 v. will be impressed across the armature of motor 27. Assuming that the normal armature voltage of the motor 27, defined as that at which the electrode will be fed at the rate at which it will normally be consumed, is 5 v. when the arc voltage is 35 v., the actual voltage across the motor will be equal to the algebraic sum of the arc voltage and the generator voltage, and under normal operating conditions this will be equal to the normal armature voltage.

The motor 27 is so connected electrically and mechanically that under the set of conditions just described said motor will rotate to feed the electrode R toward the work and this will continue until the electrode strikes the work at which instant the circuit voltage is of course reduced to zero. Thereupon the voltage across the armature of said motor will be 30 v. and in the opposite direction, thus causing the motor to reverse and move the weld rod away from the work. Likewise, when the voltage across the arc become equal to the generator voltage, the motor will stop. On the other hand, as the weld rod is consumed, the arc voltage will rise, become greater than the generator voltage, and the motor again operates to feed the weld rod toward the work. Such arc voltage will continue to rise until the algebraic sum of the arc voltage and of the generator 47 equals the assumed 5 v., i. e. the normal armature voltage of the motor 27.

If for any reason the arc voltage should increase, the voltage across the motor armature will rise above normal and the weld rod be fed more rapidly toward the work until such arc voltage and the normal armature voltage return to their predetermined values. On the other hand, should the arc voltage decrease, the voltage across the motor armature will drop below normal and the electrode be fed toward the work less rapidly, or actually retracted from the work by a reversal of the motor 27, until the arc voltage and normal armature voltage return to their predetermined values.

If the arc current is increased or the type of weld rod employed is changed so that it becomes necessary to increase the rate of electrode feed without changing the arc voltage, this may be done by decreasing the exciter voltage, thus increasing the normal motor armature voltage and in turn increasing the rate of the electrode feed. Similarly, the rate of electrode feed may be decreased for a given arc voltage by increasing the generator voltage.

Where a system of control such as the foregoing is employed, all that it is necessary for the operator of my improved apparatus to do is to move the welding tool along the line to be welded at such a rate that a layer of the granular flux material of desired depth is deposited and at the same time keep the lower projecting end of the weld rod within such layer as it traverses the line to be welded. In other words, after the arc is struck all that he need do is to regulate the traversing movement of such weld rod to permit deposit of a layer of such material of approximately uniform depth; the weld rod will then be automatically fed to maintain the proper arc length, irrespective of slight variations in the movement of the welding tool toward and from the work. The rate at which the welding operation proceeds is therefore primarily determined by regulation of the rate at which the flux material is supplied.

Furthermore, by pre-setting such rate of flux feed, the rate of welding may be determined or scheduled, inasmuch as the operator will be under a degree of compulsion to move the welding tool at a corresponding rate, for any given operation.

By thus depositing the flux in the form of a substantially unconfined stream flowing at a selected uniform rate, much the same effect is obtained as were an hour glass used to time the progress of the welding operation, the difference being that the rate of flow of the material is subject to variation or setting to suit the conditions of the particular welding job that is to be performed.

Due to the fact that the flux is deposited in substantially unconfined or free falling condition, there is no accumulation of a body of flux at any point beyond the end of screw conveyor 11, since whenever the welding operation is stopped by shutting off the supply of current to the weld rod, the deposit of flux is simultaneously stopped. In other words, the amount of flux left falling in tube 21 after the welding operation is thus stopped represents the equivalent of only a small portion of the flux which enters into the deep layer or windrow during a given brief interval.

It will be noted that by counterweighting the conveyor arm 19 and by suspending the welding tool through the medium of a flexible tube in free hanging relation from the support constituted by such tube, the latter will at no time during the welding operation be bent or twisted so as to prevent the flux from falling freely downwardly therethrough as just described. It will further be noted that as a precaution against clogging of the flux in the upper end of the tube, or more particularly in the T-coupling 20, into which the conveyor 11 discharges the flux, the corresponding end of the conveyor tube 10 projects within the corresponding wall of said T.

To insure that the proper counterbalancing of said tube 10 and the operative parts supported thereby, once established, will be maintained, not only is the flux hopper 12 placed directly over both the vertical and the horizontal axes about which said tube is mounted for movement but the reel 23 which carries the supply of weld-rod is mounted wholly independently of the parts of the mechanism which are thus counterbalanced. Otherwise as such reel is depleted the depending flexible tube with the welding tool carried thereby would lose the capacity for free manipulation that is achieved by applicant's construction.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In apparatus for arc welding, the combination of a support, a flexible tube depending in free hanging relation therefrom, means adapted to feed an electrode downwardly through said tube, contacts for supplying current to said electrode, and means adapted to supply granular fluxing material in freely falling condition through said tube in movement to fall without accumulation in the tube.

2. In apparatus for arc welding, the combination of a support, a flexible tube depending in free hanging relation therefrom, a second flexible tube disposed within said first tube, means adapted to feed an electrode downwardly through said second tube, contacts at the lower end of said tubes for supplying current to said electrode, and means adapted to supply granular fluxing material through said first tube in movement to fall without accumulation in the tube.

3. In apparatus for arc welding, the combination of a support, a flexible tube depending in free hanging relation therefrom, a second tube of insulating material disposed approximately centrally within said first tube, means adapted to feed a weld rod continuously downwardly through said second tube, contacts at the lower end of said tube insulatively carried therein for supplying current to said weld rod, and means adapted to supply granular fluxing material in free falling condition and in regulatable amount through said first tube in movement to fall without accumulation in the tube.

4. In apparatus for arc welding, a hand-manipulated electrode carrier including an arm mounted for movement vertically and horizontally, a counterweight connected to said arm, a flexible tube depending in free hanging relation from said arm, means adapted to feed a weld-rod downwardly through said tube, and contacts at the lower end of said tube adapted to supply current to said weld-rod.

5. In apparatus for arc welding, a hand-manipulated electrode carrier including an arm mounted for movement vertically and horizontally, a counterweight connected to said arm, a flexible tube depending in free hanging relation from said arm, means adapted to feed a weld-rod downwardly through said tube, contacts at the lower end of said tube adapted to supply current to said weld-rod, and means for supplying granular fluxing material to the upper end of said tube, said last-named means including a hopper mounted on said arm and a screw conveyor extending along such arm from said hopper to such upper tube end.

6. In apparatus for arc welding, the combination of a support including a counterweighted tubular arm mounted for movement about vertical and horizontal axes, a hopper for supplying granular fluxing material to such tube, such hopper being located over such axes, a flexible tube depending in free hanging relation from said arm, means adapted to convey such material from said hopper to the upper end of said tube, means adapted to feed a weld-rod downwardly through said tube, and contacts at the lower end of said tube adapted to supply current to said weld-rod.

7. In apparatus for welding, supporting means, a counterweight connected to said supporting means, a flexible member depending in free hanging relation from the supporting means, and a welding tool attached to the lower end of said member.

8. In apparatus for welding, supporting means, a counterweight connected to said supporting means, a flexible tube depending in free hanging relation from the supporting means, means adapted to feed a weld-rod downwardly through said tube, means adapted to supply current to said weld-rod, and means for supplying granular fluxing material to said tube.

LEONIDAS K. STRINGHAM.